(12) United States Patent
Penninger et al.

(10) Patent No.: US 7,098,179 B2
(45) Date of Patent: Aug. 29, 2006

(54) COTTON ACTIVE, DIRT REMOVING URETHANE-BASED POLYMERS

(75) Inventors: Josef Penninger, Hilden (DE); Wolfgang Denuell, Duesseldorf (DE); Rainer Schoenfeld, Duesseldorf (DE)

(73) Assignee: Henkel Kommanditgesellschaft auf Aktien (Henkel KGaA), Duesseldorf (DE)

( * ) Notice: Subject to any disclaimer, the term of this patent is extended or adjusted under 35 U.S.C. 154(b) by 0 days.

(21) Appl. No.: 10/830,501

(22) Filed: Apr. 22, 2004

(65) Prior Publication Data

US 2004/0224871 A1 Nov. 11, 2004

Related U.S. Application Data

(63) Continuation of application No. PCT/EP02/11446, filed on Oct. 12, 2002.

(30) Foreign Application Priority Data

Oct. 22, 2001 (DE) .................. 101 51 287
Oct. 26, 2001 (DE) .................. 101 52 308

(51) Int. Cl.
*C08G 18/10* (2006.01)
*C11D 3/37* (2006.01)

(52) U.S. Cl. ............... 510/475; 510/350; 510/356; 510/499; 8/137; 8/181

(58) Field of Classification Search ........... 510/350, 510/356, 475, 499; 8/137, 181
See application file for complete search history.

(56) References Cited

U.S. PATENT DOCUMENTS

| | | |
|---|---|---|
| 1,985,424 A | 12/1934 | Piggott |
| 2,016,962 A | 10/1935 | Flint et al. |
| 2,703,798 A | 3/1955 | Schwartz |
| 3,547,828 A | 12/1970 | Mansfield et al. |
| 3,632,957 A | 1/1972 | Hannah |
| 3,748,233 A | 7/1973 | Viccaro |
| 3,985,923 A | 10/1976 | Basadur |
| 4,068,035 A * | 1/1978 | Violland et al. .............. 442/93 |
| 4,116,885 A | 9/1978 | Derstadt et al. |
| 4,201,824 A * | 5/1980 | Violland et al. .............. 442/93 |
| 4,240,918 A * | 12/1980 | Lagasse et al. ............. 510/299 |
| 4,264,738 A | 4/1981 | Stepanov et al. |
| 4,372,868 A | 2/1983 | Saran et al. |
| 4,435,307 A | 3/1984 | Barbesgaard et al. |
| 4,443,355 A | 4/1984 | Murata et al. |
| 4,585,642 A | 4/1986 | Rieck |
| 4,590,237 A | 5/1986 | Wuhrmann et al. |
| 4,664,839 A | 5/1987 | Rieck |
| 4,713,194 A | 12/1987 | Gosselink |
| 4,832,866 A | 5/1989 | Schulz et al. |
| 4,865,774 A | 9/1989 | Fabry et al. |
| 5,002,695 A | 3/1991 | Schulz et al. |
| 5,138,046 A | 8/1992 | Wuest et al. |
| 5,183,651 A | 2/1993 | Schimmel et al. |
| 5,236,682 A | 8/1993 | Schimmel et al. |
| 5,240,851 A | 8/1993 | Paridans et al. |
| 5,268,156 A | 12/1993 | Schimmel et al. |
| 5,308,596 A | 5/1994 | Kotzian et al. |
| 5,356,607 A | 10/1994 | Just |
| 5,374,716 A | 12/1994 | Biermann et al. |
| 5,541,316 A | 7/1996 | Engelskirchen et al. |
| 5,576,425 A | 11/1996 | Hill et al. |
| 5,830,956 A | 11/1998 | Stockhausen et al. |
| 5,854,321 A | 12/1998 | Krause et al. |
| 6,342,472 B1 * | 1/2002 | Legel et al. ................ 510/345 |

FOREIGN PATENT DOCUMENTS

| | | |
|---|---|---|
| CA | 958 618 | 12/1974 |
| CA | 2 053 900 | 10/1990 |
| CA | 2 037 897 | 2/1991 |
| DE | 1 940 488 | 2/1971 |
| DE | 2 044 161 | 4/1971 |
| DE | 1 617 141 | 4/1972 |
| DE | 2 201 803 | 7/1972 |
| DE | 2 121 397 | 11/1972 |
| DE | 2 253 063 | 5/1973 |
| DE | 2 200 911 | 10/1973 |
| DE | 2 412 837 | 10/1974 |
| DE | 26 55 551 A1 | 6/1977 |
| DE | 28 46 984 A1 | 5/1979 |
| DE | 28 57 292 A1 | 2/1980 |
| DE | 31 17 250 A1 | 4/1982 |
| DE | 32 07 825 A1 | 9/1982 |

(Continued)

OTHER PUBLICATIONS

O'Lenick A.J.: "Soil Release Polymers" Journal of Surfactants and Detergents, AOCS Press, Champaign IL, US, vol. 2, No. 4, Oct. 1999, pp. 553-557, XP000893935; ISSN 1097-3958 p. 556, col. 1 paragraph 6.

*Primary Examiner*—Brian P Mruk
(74) *Attorney, Agent, or Firm*—John E. Drach; Glenn E. J. Murphy

(57) ABSTRACT

A method of washing a soiled textile comprising cotton, the method comprising contacting the textile with a wash liquor, the wash liquor containing a soil-release effective amount of one or more soil release polymers obtained by polymerizing one or more polyisocyanates with one or more polymeric polyols having an average molar mass of above 1000 D and a 20° C. water solubility of above 300 g of polymer per liter, one or more polyols having an average molar mass of below 12,000 D and a 20° C. water solubility of below 100 g per liter, and optionally one or more further polyols.

16 Claims, No Drawings

FOREIGN PATENT DOCUMENTS

| | | |
|---|---|---|
| DE | 32 07 847 A1 | 9/1982 |
| DE | 33 22 950 A1 | 1/1984 |
| DE | 33 24 258 A1 | 1/1984 |
| DE | 34 36 194 A1 | 4/1986 |
| DE | 255 884 A1 | 4/1988 |
| DE | 42 21 381 C1 | 2/1994 |
| DE | 43 00 772 A1 | 7/1994 |
| EP | 0 092 355 A1 | 10/1983 |
| EP | 0 006 638 B1 | 4/1984 |
| EP | 0 117 553 A2 | 9/1984 |
| EP | 0 037 026 A1 | 7/1985 |
| EP | 0 080 748 B1 | 7/1985 |
| EP | 0 080 223 B1 | 7/1986 |
| EP | 0 066 944 B1 | 11/1986 |
| EP | 0 204 284 A2 | 12/1986 |
| EP | 0 150 386 B1 | 12/1987 |
| EP | 0 262 588 A2 | 4/1988 |
| EP | 0 272 033 A2 | 6/1988 |
| EP | 0 130 064 B1 | 8/1988 |
| EP | 0 028 865 B2 | 3/1989 |
| EP | 0 164 514 B1 | 6/1989 |
| EP | 0 362 671 A1 | 4/1990 |
| EP | 0 214 761 B1 | 5/1990 |
| EP | 0 164 552 B1 | 7/1990 |
| EP | 0 384 717 A1 | 8/1990 |
| EP | 0 357 969 B1 | 9/1990 |
| EP | 0 385 401 A1 | 9/1990 |
| EP | 0 253 567 B1 | 12/1990 |
| EP | 0 241 985 B1 | 1/1991 |
| EP | 0 185 427 B1 | 3/1992 |
| EP | 0 218 272 B1 | 3/1992 |
| EP | 0 274 907 B1 | 8/1992 |
| EP | 0 167 309 B1 | 10/1992 |
| EP | 0 511 456 A1 | 11/1992 |
| EP | 0 452 428 B1 | 12/1992 |
| EP | 0 273 125 B1 | 3/1993 |
| EP | 0 301 298 B1 | 3/1993 |
| EP | 0 301 414 B1 | 3/1993 |
| EP | 0 330 641 B1 | 7/1993 |
| EP | 0 265 832 B1 | 10/1993 |
| EP | 0 309 931 B1 | 11/1993 |
| EP | 0 378 262 B1 | 12/1993 |
| EP | 0 425 427 B1 | 12/1993 |
| EP | 0 241 984 B1 | 3/1994 |
| EP | 0 294 753 B1 | 3/1994 |
| EP | 0 269 977 B1 | 6/1994 |
| EP | 0 378 261 B1 | 7/1994 |
| EP | 0 258 068 B1 | 8/1994 |
| EP | 0 341 947 B1 | 8/1994 |
| EP | 0 502 325 B1 | 8/1994 |
| EP | 0 376 705 A1 | 1/1995 |
| EP | 0 451 921 B1 | 1/1995 |
| EP | 0 339 550 B1 | 3/1995 |
| EP | 0 270 974 B1 | 4/1995 |
| EP | 0 548 599 B1 | 6/1995 |
| EP | 0 305 216 B1 | 8/1995 |
| EP | 0 468 102 B1 | 12/1995 |
| EP | 0 357 280 B1 | 2/1996 |
| EP | 0 375 102 B1 | 4/1996 |
| EP | 0 583 536 B1 | 3/1997 |
| EP | 0 334 462 B2 | 5/1997 |
| EP | 0 331 376 B1 | 10/1997 |
| EP | WO 99/28430 * | 6/1999 |
| EP | 0 426 835 B2 | 10/2000 |
| EP | WO 03/035712 * | 5/2003 |
| GB | 1 154 730 | 6/1969 |
| GB | 1 263 765 | 2/1972 |
| GB | 1 382 681 | 2/1975 |
| GB | 1 533 415 | 11/1978 |
| GB | 1 578 930 | 11/1980 |
| GB | 2 094 826 A | 9/1982 |
| GB | 2 095 275 A | 9/1982 |
| GB | 2 165 856 A | 4/1986 |
| JP | 04-238809 | 8/1992 |
| JP | 04-260610 | 9/1992 |
| WO | WO 90/10695 A1 | 9/1990 |
| WO | WO 90/13533 A1 | 11/1990 |
| WO | WO 91/02792 A1 | 3/1991 |
| WO | WO 91/08171 A1 | 6/1991 |
| WO | WO 91/16422 A1 | 10/1991 |
| WO | WO 92/06984 A1 | 4/1992 |
| WO | WO 93/11215 A1 | 6/1993 |
| WO | WO 93/16110 A1 | 8/1993 |
| WO | WO 95/02675 A1 | 1/1995 |
| WO | WO 97/14804 A1 | 4/1997 |

* cited by examiner

COTTON ACTIVE, DIRT REMOVING URETHANE-BASED POLYMERS

CROSS REFERENCE TO RELATED APPLICATIONS

This application is a continuation under 35 U.S.C. § 365(c) and 35 U.S.C. § 120 of international application PCT/EP02/11446, filed on Oct. 12, 2002. This application also claims priority under 35 U.S.C. § 119 of DE 101 51 287.2, filed Oct. 22, 1001 and DE 101 52 308.4, filed Oct. 26, 2001, each of which is incorporated herein by reference in its entirety.

BACKGROUND OF THE INVENTION

The present invention relates to the use of certain dirt-removing polymers for enhancing the cleaning performance of laundry detergent compositions when used for washing textiles, especially textiles which consist of or contain cotton, and also to laundry detergent compositions which comprise such dirt-removing polymers.

Laundry detergent compositions, as well as the ingredients vital to the washing operation, such as surfactants and builder materials, generally further comprise constituents which may be grouped together under the heading of wash auxiliaries and which encompass such different categories of active chemical entities as foam regulators, soil antiredeposition agents, bleaches, bleach activators and color transfer inhibitors. Such auxiliaries also include substances which endow the laundry fiber with dirt-rejecting properties and which, if present during the washing process, augment the dirt-removing ability of the other laundry detergent constituents. The same applies mutatis mutandis to cleaning compositions for hard surfaces. Such dirt-removing substances are often known as soil release agents or, on account of their ability to render the treated surface, of the fiber for example, dirt-rejecting, as soil repellents. Owing to their chemical similarity to polyester fibers in the case of textiles composed of this material, particularly effective soil release agents are copolyesters which comprise dicarboxylic acid units, alkylene glycol units and polyalkylene glycol units. Soil release copolyesters of the kind mentioned and also their use in laundry detergent compositions have been known for a fairly long time.

For instance, German Offenlegungsschrift DT 16 17 141 describes a washing process which utilizes polyethylene terephthalate-polyoxyethylene glycol copolymers. The German Offenlegungsschrift DT 22 00 911 concerns laundry detergent compositions which comprise nonionic surfactant and an interpolymer from polyoxyethylene glycol and polyethylene terephthalate. German Offenlegungsschrift DT 22 53 063 mentions acidic textile-finishing compositions which comprise a copolymer from a dibasic carboxylic acid and from an alkylene or cycloalkylene polyglycol and also optionally from an alkylene or cycloalkylene glycol. Polymers from ethylene terephthalate and polyethylene oxide terephthalate wherein the polyethylene glycol units have molecular weights from 750 to 5000 and the molar ratio of ethylene terephthalate to polyethylene oxide terephthalate is in the range from 50:50 to 90:10 and their use in laundry detergent compositions are described in the German patent DE 28 57 292. Polymers having molecular weight 15 000 to 50 000 from ethylene terephthalate and polyethylene oxide terephthalate wherein the polyethylene glycol units have molecular weights from 1000 to 10 000 and the molar ratio of ethylene terephthalate to polyethylene oxide terephthalate is in the range from 2:1 to 6:1 can be used in laundry detergent compositions, according to German Offenlegungsschrift DE 33 24 258. European patent EP 066 944 concerns textile-treating compositions which comprise a copolyester from ethylene glycol, polyethylene glycol, aromatic dicarboxylic acid and sulfonated aromatic dicarboxylic acid in certain molar ratios. European patent EP 185 427 discloses methyl- or ethyl-endcapped polyesters having ethylene and/or propylene terephthalate and polyethylene oxide terephthalate units and laundry detergent compositions which comprise such soil release polymer. European patent EP 241 984 concerns a polyester which, as well as oxyethylene groups and terephthalic acid units, also comprises substituted ethylene units and also glycerol units. European patent EP 241 985 discloses polyesters which, as well as oxyethylene groups and terephthalic acid units, comprise 1,2-propylene, 1,2-butylene and/or 3-methoxy-1,2-propylene groups and also glycerol units and are end group capped with $C_1$- to $C_4$-alkyl groups. European patent EP 253 567 concerns soil release polymers having a molar mass from 900 to 9000 from ethylene terephthalate and polyethylene oxide terephthalate, wherein the polyethylene glycol units have molecular weights from 300 to 3000 and the molar ratio of ethylene terephthalate to polyethylene oxide terephthalate is in the range from 0.6 to 0.95. European patent application EP 272 033 discloses at least partly $C_{1-4}$-alkyl- or acyl-endcapped polyesters having polypropylene terephthalate and polyoxyethylene terephthalate units. European patent EP 274 907 describes sulfoethyl-endcapped terephthalate soil release polyesters. In European patent application EP 357 280 soil release polyesters having terephthalate, alkylene glycol and poly-$C_{2-4}$-glycol units are prepared by sulfonation of unsaturated end groups. German patent application DE 26 55 551 describes the reaction of such polyesters with polymers which contain isocyanato groups and the use of the thus prepared addition polymers as soil antiredeposition agents for the washing of synthetic fibers. German patent DE 28 46 984 discloses laundry detergent compositions which comprise a soil release polymer which is a reaction product of a polyester with a prepolymer which is obtained from a diisocyanate and a hydrophilic nonionic macrodiol and contains terminal isocyanate groups.

Polymers known from this voluminous prior art have the disadvantage that they are only insufficiently effective, if at all, in the case of textiles which do not consist of polyester or at least not overwhelmingly so. But textiles today consist to a large part of cotton or cotton-polyester blends, so that there is a need for soil release polymers which perform better against greasy stains on such textiles.

It has surprisingly been found that this object is achieved by the use of certain urethane-based polymers. As used herein, the indefinite articles "a" and "a" are synonymous with the phrases "one or more" and "at least one," unless specifically defined otherwise.

DESCRIPTION OF THE INVENTION

The invention provides for the use of soil release polymers obtainable by polymerization of polyisocyanates with polymeric polyols having an average molar mass of above 1000 D and a 20° C. water solubility of above 300 g of polymer per liter and also polyols having an average molar mass of below 12 000 D and a 20° C. water solubility of below 100 g per liter and also optionally further polyols and mixtures thereof, to enhance the cleaning performance of laundry detergent compositions when used for washing textiles which consist of or contain cotton.

The detergency-enhancing effect of the polymers to be used according to the invention is particularly pronounced in the case of multiple use; that is, especially for removal of soils from textiles which consist of cotton or contain cotton and which have already been washed in the presence of the polymer before they became soiled.

Preferred polymeric polyols having an average molar mass of above 1000 D and a 20° C. water solubility of above 300 g of polymer per liter can be described by the general formula I $$W[O—(CH_2—)_a)_b—OH]_c \qquad (I)$$

where a represents a number from 1 to 3, b represents a number from 3 to 800, preferably from 17 to 800, and c represents a number from 1 to 6, wherein b can vary within any one molecule, W represents H— where c=1,
—$(CH_2)_d$— where c=2, wherein d represents a number from 2 to 12,
—$CH_2$—$(CH—)_e$—$CH_2$— where c=e+2, wherein e represents a number from 1 to 4,
—$(CH_2)_e$—$CH(CH_2—)$—$(CH_2)_e$— where c=3, wherein e represents a number from 1 to 4, or represents any aliphatic, alicyclic or aromatic radical or a radical which comprises both aliphatic and aromatic groups.

Particularly preferred polymeric polyol having high water solubility is polyethylene glycol and very particular preference is given to polyethylene glycol having an average molar mass between 3000 and 12 000 D.

Preferred polyols having an average molar mass of below 12 000 D and a 20° C. water solubility of below 100 g per liter can be described by the general formulae (II) to (V)

$$HO—X—CHY—OH \qquad (II)$$

where X represents a linear or branched alkylene group having 1 to 48 carbon atoms and Y represents hydrogen or an alkyl group having 1 to 24 carbon atoms, $$V[(O—((CH_2—)_fCHR^1—)_g)_hOH]_i \qquad (III)$$

where $R^1$ represents hydrogen or an alkyl group having 1 to 6 carbon atoms, f represents a number from 0 to 3, g represents a number from 1 to 4 and h represents a number from 5 to 300, wherein $R^1$, f and h can vary within any one molecule;
V represents H— where i=1,
—$(CH_2)_k$— where i=2, wherein k represents a number from 2 to 12,
—$CH_2$—$(CH—)_l$—$CH_2$— where i=l+2, wherein l represents a number from 1 to 4,
—$(CH_2)_l$—$CH(CH_2—)$—$(CH_2)_l$— where c=3, wherein l represents a number from 1 to 4, or represents any aliphatic, alicyclic or aromatic radical or a radical which comprises both aliphatic and aromatic groups, $$HO((—CHR^2(—CH_2)_m)_n—O)_o—Cy—C(R^3)(R^4)— \\ Cy—(O—((CH_2—)_pCHR^2—)_q)_rOH \qquad (IV)$$

where Cy represents phenylene or cyclohexylidene, $R^2$ represents hydrogen or an alkyl group having 1 to 6 carbon atoms, $R^3$ and $R^4$ independently represent hydrogen or an alkyl group having 1 to 6 carbon atoms or together form an aliphatic bridge $(CR^5R^6)_s$, where s represents a number from 4 to 6 and $R^5$ and $R^6$ independently represent H or an alkyl group having 1 to 6 carbon atoms or a double bond, wherein $R^5$ and $R^6$ can vary within any one bridge, m and p independently represent a number from 0 to 3, n and q independently represent a number from 1 to 4 and o and also r independently represent a number from 0 to 20, wherein $R^2$, m and p can vary within any one molecule, $$V[—O—C(O)—(C(R^7)(R^8))_t—(CHOH)_u—(CH_2)_w— \\ H]_i \qquad (V)$$

where $R^7$ and $R^8$ independently represent H or an alkyl group having 1 to 6 carbon atoms or a multiple bond to the adjacent carbon atom, wherein $R^7$ and $R^8$ can vary within any one molecule, t and w independently represent a number from 0 to 20 and u represents 0 or 1, wherein t, u and w can vary within any one molecule,
V represents H— or $CH_3$— where i=1,
—$(CH_2)_k$— where i=2, wherein k represents a number from 2 to 12,
—$CH_2$—$(CH—)_l$—$CH_2$— where i=l+2, wherein l represents a number from 1 to 4,
HO—$CH_2$—$(CH—)_l$—$CH_2$— where i=l+1, wherein l represents a number from 1 to 4,
—$(CH_2)_l$—$CH(CH_2—)$—$(CH_2)_l$— where c=3, wherein l represents a number from 1 to 4, or represents any aliphatic, alicyclic or aromatic radical or a radical which comprises both aliphatic and aromatic groups.

Polymeric polyols as per formula (III) are preferably derived from 1,2-propylene glycol, 1,2-butanediol, 1,3-propylene glycol, 1,4-butanediol, 1,5-pentanediol, 1,6-hexanediol and/or neopentyl glycol. Particularly preferred polymeric polyols as per formula (III) are polypropylene oxide and polytetrahydrofuran having average degrees of polymerization in the range from 3 to 70.

Polymeric diols as per formula (IV) are preferably derived from bisphenol A or bisphenol F. Particularly preferred diols as per formula (IV) are propoxylated and ethoxylated bisphenol A.

Preferred polyols as per formula (V) are castor oil, partially hydrogenated castor oil, partially hydrolyzed castor oil and also derivatives thereof.

Preferred further polyols are dimethylolpropionic acid and its salts, N-alkyldiethanolamine and its salts and also water-soluble polymeric polyols having an average molar mass of below 1000 D and a 20° C. water solubility of above 500 g of polymer per liter which conform to the general formula I where a represents a number from 1 to 3, b represents a number from 3 to 16 and c represents a number from 1 to 6, wherein b can vary within any one molecule. In these compounds, W may represent H— where c=1,
—$(CH_2)_d$— where c=2, wherein d represents a number from 2 to 12,
—$CH_2$—$(CH—)_e$—$CH_2$— where c=e+2, wherein e represents a number from 1 to 4,
—$(CH_2)_e$—$CH(CH_2—)$—$(CH_2)_e$— where c=3, wherein e represents a number from 1 to 4, or represents any aliphatic, alicyclic or aromatic radical or a radical which comprises both aliphatic and aromatic groups.

The particularly preferred polyols also include polyethylene glycol having an average molar mass from 300 D to 1000 D.

A further preferred embodiment of the invention utilizes polymers which are obtainable through use of mixtures of at least two polymeric diols having different degrees of polymerization (b in formula I), wherein the degrees of polymerization of the two polymeric diol variants as per formula I preferably differ by a factor of at least 10, for example in the case of using a first polymeric diol having a degree of polymerization in the range from 8 to 15 and a second polymeric diol having a degree of polymerization in the range from 100 to 150.

The polyisocyanates are compounds of the general structure (O=C=N—)$_t$Z wherein t represents 2 or 3, Z is an aliphatic or aromatic radical or a radical which comprises both aliphatic and aromatic groups. Preference among these is given to compounds wherein the isocyanate groups are attached to an aromatic radical via alkylene groups or wherein the isocyanate groups are attached to aromatic radicals which are attached to each other directly or via an alkylene group. In a preferred embodiment of the invention, the polyisocyanate is a diisocyanate.

Useful diisocyanates include for example 1,5-naphthylene diisocyanate, 4,4'-diphenylmethane diisocyanate (MDI), hydrogenated MDI (H$_{12}$MDI), xylylene diisocyanate (XDI), tetramethylxylylene diisocyanate (TMXDI), 4,4'-diphenyldimethylmethane diisocyanate, di- and tetraalkyldiphenylmethane diisocyanate, 4,4'-dibenzyl diisocyanate, 1,3-phenylene diisocyanate, 1,4-phenylene diisocyanate, the isomers of tolylene diisocyanate (TDI), 1-methyl-2,4-diisocyanatocyclohexane, 1,6-diisocyanato-2,2,4-trimethylhexane, 1,6-diisocyanato-2,4,4-trimethylhexane, 1-isocyanatomethyl-3-isocyanato-1,5,5-trimethylcyclohexane (IPDI), chlorinated and brominated diisocyanates, phosphorus-containing diisocyanates, 4,4'-diisocyanatophenyl perfluoroethane, tetramethoxybutane 1,4-diisocyanate, butane 1,4-diisocyanate, hexane 1,6-diisocyanate (HDI), 1,4-dicyclohexylmethane diisocyanate, cyclohexane 1,4-diisocyanate, ethylene diisocyanate, bisisocyanatoethyl phthalate, also diisocyanates having reactive halogen atoms, such as 1-chloromethylphenyl 2,4-diisocyanate, 1-bromomethylphenyl 2,6-diisocyanate, 3,3-bischloromethyl ether 4,4'-diphenyl diisocyanate. Sulfur-containing polyisocyanates are obtained for example by reacting 2 mol of hexamethylene diisocyanate with 1 mol of thiodiglycol or dihydroxydihexyl sulfide. Further important diisocyanates are trimethylhexamethylene diisocyanate, 1,4-diisocyanatobutane, 1,12-diisocyanatododecane and dimer fatty acid diisocyanate. Particularly suitable are: tetramethylene, hexamethylene, undecane, dodecamethylene, 2,2,4-trimethylhexane, 1,3-cyclohexane, 1,4-cyclohexane, 1,3- or 1,4-tetramethylxylene, isophorone, 4,4-dicyclohexylmethane and lysine ester diisocyanates. Very particular preference is given to 4,4'-diphenylmethane diisocyanate and/or tetramethylxylol diisocyanate, especially m-TMXDI.

The molar ratio of polyol—that is, the sum total of polymeric polyols as per formula (I) and polyol as per formulae (II) to (V)—to polyisocyanate is preferably in the range from 1:1 to 1.5:1 and especially in the range from 1.05:1 to 1.3:1. The molecular weight or to be more precise the average molecular weight or the maximum of the molecular weight distribution of preferred soil release polyurethanes is in the range from 1500 to 2 000 000 and especially in the range from 8000 to 150 000.

The basically well-known preparation of polyurethanes to be used particularly preferably according to the invention is preferably accomplished by, initially, a first stage of reacting the polyisocyanate, preferably a diisocyanate, and polymeric polyol as per formula (I), which is preferably a diol (c=2), using excess polyol to prepare prepolymers which, in a second stage, are extended by reaction with further polyisocyanate and a polyol as per formula (II), (III), (IV) or (V), which is preferably likewise a diol. It is possible to utilize a different isocyanate in the second stage than in the first stage, for example to conduct the reaction of the first stage with MDI and the reaction of the second stage with TMXDI.

When, as noted above, a plurality of polymeric polyols as per formula (I) having different degrees of polymerization are to be used, it is preferable to employ that which has the lowest degree of polymerization in the first stage and that or those having a higher degree of polymerization in the second stage together with the polyol as per formula (II), (III), (IV) or (V). In the last version, it is preferable to utilize a polymeric diol as per formula (I) where b represents a number from 3 to 16 in the first stage and a polymeric diol as per formula (I) where b represents a number from 17 to 800 in the second stage. Urethane-based polymers thus obtainable are preferred for use in the realm of the present invention.

The polyurethanes used according to the invention are as described simple to prepare and generally recognized as safe by ecologists as well as toxicologists. They lead to significantly better detachment of especially fatty and cosmetic soils from cotton or cotton-containing fabrics than is the case on using compounds previously known for this purpose. Alternatively, for the same fat-detaching performance, significant amounts of surfactants can be saved.

The invention further provides for the use of a combination of such cotton-active soil release polymer based on urethane with a polyester-active soil release polymer from a dicarboxylic acid and an optionally polymeric diol to enhance the cleaning performance of laundry detergent compositions when used for washing textiles.

Known polyester-active soil release polymers which can be used in addition to the urethane-based polymers which are essential to the invention include copolyesters from dicarboxylic acids, for example adipic acid, phthalic acid or terephthalic acid, diols, for example ethylene glycol or propylene glycol, and polydiols, for example polyethylene glycol or polypropylene glycol. Preferred soil release polyesters include such compounds which are formally obtainable through esterification of two monomer fractions, the first monomer being a dicarboxylic acid HOOC-Ph-COOH and the second monomer being a diol HO—(CHR$^{11}$—)$_a$OH, which can also be in the form of a polymeric diol H—(O—(CHR$_{11}$—)$_a$)$_b$OH, wherein Ph denotes an o-, m- or p-phenylene radical which can bear from 1 to 4 substituents selected from alkyl radicals having 1 to 22 carbon atoms, sulfonic acid groups, carboxyl groups and mixtures thereof, R$^{11}$ denotes hydrogen, an alkyl radical having 1 to 22 carbon atoms and mixtures thereof, a denotes a number from 2 to 6 and b denotes a number from 1 to 300. Preferably, the polyesters obtainable therefrom comprise not only monomeric diol units —O—(CHR$_{11}$—)$_a$O— but also polymeric diol units —(O—(CHR$^{11}$—)$_a$)$_b$O—. The molar ratio of monomeric diol units to polymeric diol units is preferably in the range from 100:1 to 1:100 and especially in the range from 10:1 to 1:10. The degree of polymerization b in the polymeric diol units is preferably in the range from 4 to 200 and especially in the range from 12 to 140. The molecular weight or to be more precise the average molecular weight or the peak of the molecular weight distribution of preferred soil release polyesters is in the range from 250 to 100 000 and especially in the range from 500 to 50 000. The parent acid of the Ph radical is preferably chosen from terephthalic acid, isophthalic acid, phthalic acid, trimellitic acid, mellitic acid, the isomers of sulfophthalic acid, sulfoisophthalic acid and sulfoterephthalic acid and also mixtures thereof. When their acid groups are not part of the ester bonds in the polymer, they are preferably present in salt form, especially as alkali metal salt or ammonium salt. Of these, the sodium and potassium salts are particularly preferred. If desired, instead of the HOOC-Ph-COOH monomer, small fractions, especially not more than 10 mol % based on the fraction of Ph having the above-defined meaning, of other acids which comprise at least two carboxyl groups may be present in the soil release polyester. These include for example alkylene- and alkenylenedicarboxylic acids such as malonic acid, succinic acid, fumaric acid, maleic acid, glutaric acid, adipic acid, pimelic acid, suberic acid, azelaic acid and sebacic acid. Preferred diols HO—(CHR$^{11}$—)$_a$OH include those in which R$^{11}$ is hydrogen and a is a number from 2 to 6 and those in which a has the value 2 and R$^{11}$ is selected from hydrogen and the alkyl radicals having 1 to 10 and especially 1 to 3 carbon atoms. Of the diols mentioned last, those of the formula HO—CH$_2$—CHR$^{11}$—OH where R$^{11}$ is as defined above are particularly preferred. Examples of diol components are ethylene glycol, 1,2-propylene glycol, 1,3-propylene glycol, 1,4-butanediol, 1,5-pentanediol, 1,6-hexanediol, 1,8-octanediol, 1,2-decanediol, 1,2-dodecanediol and neopentyl glycol. As to polymeric diols, polyethylene glycol having an average molar mass in the range from 1000 to 6000 is particularly preferred.

If desired, the polyesters having the composition described above can also be end group capped, in which case possible end groups include alkyl groups having 1 to 22 carbon atoms and esters of monocarboxylic acids. End groups bound via ester bonds can be based on alkyl-, alkenyl- and arylmonocarboxylic acids having 5 to 32 carbon atoms and especially 5 to 18 carbon atoms. These include valeric acid, caproic acid, enanthic acid, caprylic acid, pelargonic acid, capric acid, undecanoic acid, undecenoic acid, lauric acid, lauroleic acid, tridecanoic acid, myristic acid, myristoleic acid, pentadecanoic acid, palmitic acid, stearic acid, petroselic acid, petroselaidic acid, oleic acid, linoleic acid, linoledic acid, linolenic acid, eleaosteric acid, arachidic acid, gadoleic acid, arachidonic acid, behenic acid, erucic acid, brassidic acid, clupanodonic acid, lignoceric acid, cerotic acid, melissic acid, benzoic acid, which may bear from 1 to 5 substituents having a total up to 25 carbon atoms and especially 1 to 12 carbon atoms, for example tert-butyl benzoic acid. The end groups may also be based on hydroxymonocarboxylic acids having 5 to 22 carbon atoms, which include for example hydroxyvaleric acid, hydroxycaproic acid, ricinoleic acid, its hydroxystearic acid hydrogenation product and also o-, m- and p-hydroxybenzoic acid. The hydroxymonocarboxylic acids may in turn be joined together via their hydroxyl group and their carboxyl group and can thus be present in an end group more than once. Preferably, the number of hydroxymonocarboxylic acid units per end group, i.e., its degree of oligomerization, is preferably in the range from 1 to 50 and especially in the range from 1 to 10. The preferred form of the invention utilizes polymers from ethylene terephthalate and polyethylene oxide terephthalate wherein the polyethylene glycol units have molecular weights from 750 to 5000 and the molar ratio of ethylene terephthalate to polyethylene oxide terephthalate is in the range from 50:50 to 90:10 in combination with nitrogenous soil release polymers.

The soil release polymers to be used according to the invention are preferably water soluble, which term is to be understood as meaning a solubility of at least 0.01 g and preferably at least 0.1 g of the polymer per liter of water at room temperature and pH 8. Preferred polymers, however, have a solubility of at least 1 g per liter and especially at least 10 g per liter under these conditions.

The use according to the invention in the framework of a washing operation can take the form of the urethane-based polymer being introduced into a wash liquor either separately from the laundry detergent or as a constituent of the laundry detergent. The invention accordingly further provides a laundry detergent composition which comprises a urethane-based polymer described above.

Laundry detergent compositions which comprise a urethane-based polymer to be used according to the invention may comprise all customary other constituents of such compositions that do not interact undesirably with the soil release polymer essential to the invention. The amounts in which the polymer is incorporated in laundry detergent compositions are preferably in the range from 0.1% by weight to 5% by weight and especially in the range from 0.5% by weight to 2.5% by weight.

It was surprisingly found that such polymers having the properties indicated above influence the performance of certain other washing and cleaning composition ingredients positively and that conversely a performance of the cotton-active soil release polymer is enhanced by certain other laundry detergent composition ingredients. These effects arise in particular in the case of enzymatically active ingredients, especially proteases and lipases, in the case of water-insoluble inorganic builders, in the case of water-soluble inorganic and organic builders, especially based on oxidized carbohydrates, in the case of bleaches based on peroxygen, especially in the case of alkali metal percarbonate, and in the case of synthetic anionic surfactants of the sulfate and sulfonate type, which is why the use of the ingredients mentioned together with polymers to be used according to the invention is preferred.

In a preferred embodiment, such a composition comprises nonionic surfactant selected from fatty alkyl polyglycosides, fatty alkyl polyalkoxylates, especially ethoxylates and/or propoxylates, fatty acid polyhydroxyamides and/or ethoxylation and/or propoxylation products of fatty alkylamines, vicinal diols, fatty acid alkyl esters and/or fatty acid amides and also mixtures thereof, especially in an amount in the range from 2% by weight to 25% by weight.

A further embodiment of such compositions comprises the presence of synthetic anionic surfactant of the sulfate and/or sulfonate type, especially fatty alkyl sulfate, fatty alkyl ether sulfate, sulfo fatty acid esters and/or sulfo fatty acid disalts, especially in an amount in the range from 2% by weight to 25% by weight. The anionic surfactant is preferably selected from alkyl or alkenyl sulfates and/or alkyl or alkenyl ether sulfates in each of which the alkyl or alkenyl group possesses 8 to 22 and especially 12 to 18 carbon atoms.

Suitable nonionic surfactants include the alkoxylates, in particular the ethoxylates and/or propoxylates of saturated or mono- to polyunsaturated linear or branched-chain alcohols having from 10 to 22 carbon atoms, preferably from 12 to 18 carbon atoms. The degree of alkoxylation in the alcohols is usually between 1 and 20, preferably between 3 and 10. They can be prepared in a known manner by reaction of the corresponding alcohols with the corresponding alkylene oxides. Suitable are in particular the derivatives of fatty alcohols, although their branched-chain isomers, in particular oxo process alcohols, can also be employed for the preparation of useful alkoxylates. It is possible to use, for example, the alkoxylates, in particular the ethoxylates, of primary alcohols containing linear, in particular dodecyl, tetradecyl, hexadecyl or octadecyl radicals and mixtures thereof. In addition, corresponding alkoxylation products of alkylamines, vicinal diols and carboxamides, which correspond to said alcohols as regards the alkyl moiety, can be used. Furthermore the ethylene oxide and/or propylene oxide insertion products of fatty acid alkyl esters, as can be prepared according to the process given in the international patent application WO 90/13533, and fatty acid polyhydroxyamides, as can be prepared, for example, according to the processes of U.S. Pat. No. 1,985,424, U.S. Pat. No. 2,016,962 and U.S. Pat. No. 2,703,798 and international patent application WO 92/06984, are suitable. Alkyl polyglycosides suitable for incorporation into the products according to the invention are compounds of the formula $(G)_n$—$OR^{12}$, in which $R^{12}$ is an alkyl or alkenyl radical having from 8 to 22 carbon atoms, G is a glycose unit and n is a number between 1 and 10. Such compounds and their preparation are described, for example, in European patent applications EP 92 355, EP 301 298, EP 357 969 and EP 362 671 or U.S. Pat. No. 3,547,828. The glycoside component $(G)_n$ is an oligomer or polymer of naturally occurring aldose or ketose monomers, which include, in particular, glucose, mannose, fructose, galactose, talose, gulose, altrose, allose, idose, ribose, arabinose, xylose and lyxose. The oligomers which consist of such monomers joined glycosidally are characterized both by the type of sugar present therein and by its number, the degree of oligomerization. The degree of oligomerization n is a value which is determined analytically and generally assumes fractional values; it is between 1 and 10, in the case of the preferred glycosides below 1.5, in particular between 1.2 and 1.4. A preferred monomer unit is glucose because it is readily available. The alkyl or alkenyl moiety $R^{12}$ in the glycosides likewise preferably originates from readily accessible derivatives of renewable raw materials, in particular from fatty alcohols, although their branched-chain isomers, in particular oxo alcohols, can also be used to prepare utilizable glycosides. Accordingly, it is possible to use, in particular, the primary alcohols having linear octyl, decyl, dodecyl, tetradecyl, hexadecyl or octadecyl radicals and mixtures thereof. Particularly preferred alkyl glycosides contain a coconut fatty alkyl radical, i.e. mixtures where essentially $R^{12}$=dodecyl and $R^{12}$=tetradecyl.

The amounts in which nonionic surfactant is present in compositions which comprise a soil release agent used according to the invention are preferably in the range from 1% by weight to 30% by weight, especially from 1% by weight to 25% by weight, although amounts in the upper part of this range being more likely in liquid detergents while particulate detergents preferably contain smaller amounts of up to 5% by weight.

The compositions may instead or additionally comprise further surfactants, preferably synthetic anionic surfactants of the sulfate or sulfonate type, such as for example alkylbenzenesulfonates, in amounts of preferably not above 20% by weight and especially in the range from 0.1% by weight to 18% by weight, all based on total composition. Synthetic anionic surfactants which are particularly suitable for use in such compositions are the alkyl and/or alkenyl sulfates having 8 to 22 carbon atoms which bear an alkali metal, ammonium or alkyl- or hydroxyalkyl-substituted ammonium ion as a counter cation. Preference is given to derivatives of fatty alcohols having especially 12 to 18 carbon atoms and their branched-chain analogs, the oxo process alcohols. The alkyl and alkenyl sulfates are preparable in known manner by reaction of the corresponding alcohol component with a customary sulfating reagent, especially sulfur trioxide or chlorosulfonic acid, and subsequent neutralization with alkali metal, ammonium or alkyl- or hydroxyalkyl-substituted ammonium bases. The amounts in which such alkyl and/or alkenyl sulfates are present in the compositions which comprise a urethane-based polymer according to the invention are preferably in the range from 0.1% by weight to 15% by weight and especially in the range from 0.5% by weight to 10% by weight.

Useful surfactants of the sulfate type also include the sulfated alkoxylation products of the alcohols mentioned, so-called ether sulfates. Such ether sulfates preferably contain from 2 to 30 and especially from 4 to 10 ethylene glycol groups per molecule. Suitable anionic surfactants of the sulfonate type include the α-sulfo esters which are obtainable by reaction of fatty acid esters with sulfur trioxide and subsequent neutralization, especially the sulfonation products derived from fatty acids having from 8 to 22 carbon atoms, preferably 12 to 18 carbon atoms, and linear alcohols having 1 to 6 carbon atoms, preferably 1 to 4 carbon atoms, and also the sulfo fatty acids derived from these sulfonation products by formal saponification.

Other optional surface-active ingredients include soaps, wherein saturated fatty acid soaps, such as the salts of lauric acid, myristic acid, palmitic acid or stearic acid, and also soaps derived from natural fatty acid mixtures, for example coconut, palm kernel or tallow fatty acids. Particular preference is given to soap mixtures which are composed of 50% by weight to 100% by weight saturated $C_{12}$–$C_{18}$ fatty acid soaps and up to 50% by weight oleic acid soap. Soap is preferably included in amounts from 0.1% by weight to 5% by weight. However, higher soap levels of up to about 20% by weight may be included in liquid compositions which comprise a polymer used according to the invention.

In a further embodiment, a composition which comprises a polymer to be used according to the invention comprises water-soluble and/or water-insoluble builders, in particular selected from alkali metal aluminosilicate, crystalline alkali metal silicate having a modulus above 1, monomeric polycarboxylate, polymeric polycarboxylate and mixtures thereof, especially in amounts in the range from 2.5% by weight to 60% by weight.

A composition which comprises a polymer to be used according to the invention preferably comprises from 20% by weight to 55% by weight of water-soluble and/or water-insoluble organic and/or inorganic builders. The water-soluble organic builder substances include, in particular, those from the class of polycarboxylic acids, in particular citric acid and sugar acids, and the polymeric (poly)carboxylic acids, in particular the polycarboxylates obtained by oxidation of polysaccharides as in international patent application WO 93/16110, polymeric acrylic acids, methacrylic acids, maleic acids and mixed polymers thereof, which may also comprise small amounts of polymerizable substances without carboxylic acid functionality incorporated by polymerization. The relative molecular mass of the homopolymers of unsaturated carboxylic acids is generally between 5000 and 200 000, that of the copolymers is between 2000 and 200 000, preferably between 50 000 and 120 000, based on free acid. A particularly preferred acrylic acid-maleic acid copolymer has a relative molecular mass of from 50 000 to 100 000. Suitable, if less preferred, compounds of this class are copolymers of acrylic acid or methacrylic acid with vinyl ethers, such as vinyl methyl ethers, vinyl esters, ethylene, propylene and styrene, in which the proportion of the acid is at least 50% by weight. Water-soluble organic builder substances which may be used are also terpolymers which comprise, as monomers, two carboxylic acids and/or salts thereof and, as a third monomer, vinyl alcohol and/or a vinyl alcohol derivative or a carbohydrate. The first acidic monomer or the salt thereof is derived from a monoethylenically unsaturated $C_3$–$C_8$-carboxylic acid and preferably from a $C_3$–$C_4$-monocarboxylic acid, in particular from (meth)acrylic acid. The second acidic monomer or the salt thereof can be a derivative of a $C_4$–$C_8$-dicarboxylic acid, maleic acid being particularly preferred. The third monomeric unit is in this case formed from vinyl alcohol and/or preferably an esterified vinyl alcohol. In particular, vinyl alcohol derivatives which are esters of short-chain carboxylic acids, for example of $C_1$–$C_4$-carboxylic acids, with vinyl alcohol are preferred. Preferred terpolymers comprise from 60% by weight to 95% by weight, in particular from 70% by weight to 90% by weight of (meth)acrylic acid or (meth)acrylate, particularly preferably acrylic acid or acrylate, and maleic acid or maleate and from 5% by weight to 40% by weight, preferably from 10% by weight to 30% by weight of vinyl alcohol and/or vinyl acetate. In this connection, very particular preference is given to terpolymers in which the weight ratio of (meth)acrylic acid or (meth)acrylate to maleic acid or maleate is between 1:1 and 4:1, preferably between 2:1 and 3:1 and in particular between 2:1 and 2.5:1. Both the amounts and the weight ratios refer to the acids. The second acidic monomer or the salt thereof can also be a derivative of an allylsulfonic acid which is substituted in the 2-position by an alkyl radical, preferably by a $C_1$–$C_4$-alkyl radical, or an aromatic radical which is preferably derived from benzene or benzene derivatives. Preferred terpolymers comprise from 40% by weight to 60% by weight, in particular from 45 to 55% by weight of (meth) acrylic acid or (meth)acrylate, particularly preferably acrylic acid or acrylate, from 10% by weight to 30% by weight, preferably from 15% by weight to 25% by weight of methallyl sulfonic acid or methallyl sulfonate and as third monomer 15% by weight to 40% by weight, preferably 20% by weight to 40% by weight, of a carbohydrate. This carbohydrate can be, for example, a mono-, di-, oligo- or polysaccharide, mono-, di- or oligosaccharides being preferred and sucrose being particularly preferred. Insertion of the third monomer presumably incorporates desired breaking points in the polymer, which are responsible for the good biodegradability of the polymer. These terpolymers can be prepared, in particular, by processes which are described in German patent DE 42 21 381 and German patent application DE 43 00 772, and generally have a relative molecular mass between 1000 and 200 000, preferably between 200 and 50 000 and in particular between 3000 and 10 000. They can be used, particularly for the preparation of liquid products, in the form of aqueous solutions, preferably in the form of from 30 percent by weight to 50 percent by weight aqueous solutions. All of the polycarboxylic acids mentioned are usually used in the form of their water-soluble salts, in particular their alkali metal salts.

Organic builder substances of this type are preferably present in amounts up to 40% by weight, in particular up to 25% by weight and particularly preferably from 1% by weight to 5% by weight. Amounts close to the stated upper limit are preferentially used in paste or liquid, in particular aqueous, products which comprise the polymer according to the invention.

Water-insoluble, water-dispersible inorganic builder materials which are used are, in particular, crystalline or amorphous alkali metal alumosilicates, in amounts of up to 50% by weight, preferably no more than 40% by weight and in liquid products, in particular from 1% by weight to 5% by weight. Of these, the crystalline alumosilicates of detergent quality, in particular zeolite NaA and in some instances zeolite NaX, are preferred. Quantities close to the stated upper limit are preferably used in solid, particulate products. In particular, suitable alumosilicates do not have any particles greater than 30 mm in size and preferably consist of at least 80% by weight of particles less than 10 mm in size. Its calcium-binding ability, which can be determined according to the details in German patent DE 24 12 837, is usually in the range from 100 to 200 mg of CaO per gram. Suitable substitutes or partial substitutes for said alumosilicate are crystalline alkali metal silicates which can be present alone or mixed with amorphous silicates. The alkali metal silicates which can be used as backbone substances in the products preferably have a molar ratio of alkali metal oxide to $SiO_2$ of less than 0.95, in particular of 1:1.1 to 1:12 and can be amorphous or crystalline. Preferred alkali metal silicates are the sodium silicates, in particular the amorphous sodium silicates, having a molar ratio of $Na_2O:SiO_2$ of 1:2 to 1:2.8. Such amorphous alkali metal silicates are commercially obtainable for example under the Portil® name. Those having a molar $Na_2O:SiO_2$ ratio in the range from 1:1.9 to 1:2.8 are preparable by the process of European patent application EP 0 425 427. In the course of production, they are preferably added as a solid and not in the form of a solution. Crystalline silicates which are used and which may be present alone or mixed with amorphous silicates are preferably crystalline phyllosilicates of the formula $Na_2Si_xO_{2x+1} \cdot yH_2O$, in which x, the modulus, is a number from 1.9 to 4 and y is a number from 0 to 20 and preferred values of x are 2, 3 or 4. Crystalline phyllosilicates which fall under this formula are described, for example, in European patent application EP 0 164 514. Preferred crystalline phyllosilicates are those in which x in the stated formula assumes the value 2 or 3. In particular, both β- and δ-sodium disilicates ($Na_2Si_2O_5 \cdot yH_2O$) are preferred, β-sodium disilicate being obtainable, for example, by the process which is described in international patent application WO 91/08171. δ-Sodium silicates having a modulus between 1.9 and 3.2 can be prepared according to Japanese patent application JP 04/238 809 or JP 04/260 610. Crystalline alkali metal silicates of the above formula in which x is a number from 1.9 to 2.1, which are virtually anhydrous and prepared from amorphous alkali metal silicates as in European patent applications EP 0 548 599, EP 0 502 325 and EP 0 452 428, can also be used in products which comprise a polymer according to the invention. In a further preferred version of products according to the invention, a crystalline sodium phyllosilicate having a modulus of from 2 to 3 is used, as can be prepared from sand and soda according to the process of European patent application EP 0 436 835. Crystalline sodium silicates having a modulus in the range from 1.9 to 3.5, as are obtainable by the processes of European patents EP 0 164 552 and/or European patent application EP 0 294 753, are used in a further preferred variant of detergents or cleaners which comprise a polymer according to the invention. Their content of alkali metal silicates is preferably from 1% by weight to 50% by weight and in particular from 5% by weight to 35% by weight, based on anhydrous active substance. If alkali metal alumosilicate, in particular zeolite, is present as additional builder substance, the content of alkali metal silicate is preferably from 1% by weight to 15% by weight and in particular from 2% by weight to 8% by weight, based on anhydrous active substance. The weight ratio of alumosilicate to silicate, in each case based on anhydrous active substances, is then preferably from 4:1 to 10:1. In products which comprise both amorphous and crystalline alkali metal silicates, the weight ratio of amorphous alkali metal silicate to crystalline alkali metal silicate is preferably from 1:2 to 2:1 and in particular from 1:1 to 2:1.

In addition to the inorganic builders mentioned, the compositions which comprise a soil release polymer to be used according to the invention may comprise further water-soluble or water-insoluble inorganic substances. Suitable in this connection are the alkali metal carbonates, alkali metal bicarbonates and alkali metal sulfates and also their mixtures. Such additional inorganic material may be present in amounts of up to 70% by weight.

In addition, the compositions may comprise further constituents which are customary in laundry detergents and cleaners. These optional constituents include in particular enzymes, enzyme stabilizers, bleaches, bleach activators, complexing agents for heavy metals, for example aminopolycarboxylic acids, aminohydroxypolycarboxylic acids, polyphosphonic acids and/or aminopolyphosphonic acids, antiredeposition agents, for example cellulose ethers, color transfer inhibitors, for example polyvinylpyrrolidone or polyvinylpyridine-N-oxide, foam inhibitors for example organopolysiloxanes or paraffins, solvents and optical brighteners, for example stilbenedisulfonic acid derivatives. The novel products which comprise a polymer according to the invention preferably comprise up to 1% by weight, in particular from 0.01% by weight to 0.5% by weight, of optical brighteners, in particular compounds from the class of substituted 4,4'-bis(2,4,6-triamino-s-triazinyl)stilbene-2, 2'-disulfonic acids, up to 5% by weight, in particular from 0.1% by weight to 2% by weight, of complexing agents for heavy metals, in particular aminoalkylenephosphonic acids and salts thereof, up to 3% by weight, in particular 0.5% by weight to 2% by weight of antiredeposition agents and up to 2% by weight, in particular 0.1% by weight to 1% by weight of foam inhibitors, said parts by weight referring in each case to the total product.

Solvents which are used in particular in the case of novel liquid products which comprise a polymer according to the invention are, as well as water, preferably those which are water-miscible. These include the low molecular weight alcohols, for example ethanol, propanol, iso-propanol, and the isomeric butanols, glycerol, low molecular weight glycols, for example ethylene glycol and propylene glycol, and the ethers which are derived from said classes of compounds. In such liquid products, the polyesters according to the invention are usually present in dissolved or suspended form.

Enzymes which are optionally present are preferably chosen from the group consisting of protease, amylase, lipase, cellulase, hemicellulase, oxidase, peroxidase or mixtures thereof. The most suitable is protease obtained from microorganisms, such as bacteria or fungi. It can be obtained in a known manner by fermentation processes from suitable microorganisms, which are described, for example, in German Offenlegungsschriften DE-A-19 40 488, DE-A-20 44 161, DE-A-22 01 803 and DE-A-21 21 397, U.S. patent specifications U.S. Pat. No. 3,632,957 and U.S. Pat. No. 4,264,738, European patent application EP 006 638 and international patent application WO 91/02792. Proteases are available commercially, for example under the names BLAP®, Savinase®, Esperase®, Maxatase®, Optimase®, Alcalase®, Durazym® or Maxapem®. The lipase which may be used can be obtained from Humicola lanuginosa, as described, for example, in European patent applications EP 258 068, EP 305 216 and EP 341 947, from Bacillus types, as described for example, in the international patent application WO 91/16422 or European patent application EP 384 717, from Pseudomonas types, as described, for example, in European patent applications EP 468 102, EP 385 401, EP 375 102, EP 334 462, EP 331 376, EP 330 641, EP 214 761, EP 218 272 or EP 204 284 or international patent application WO 90/10695, from Fusarium types, as described, for example, in European patent application EP 130 064, from Rhizopus types, as described, for example, in European patent application EP 117 553, or from Aspergillus types, as described, for example, in European patent application EP 167 309. Suitable lipases are available commercially, for example under the names Lipolase®, Lipozym®, Lipomax®, Amano®-Lipase, Toyo-Jozo®-Lipase, Meito®-Lipase and Diosynth®-Lipase. Suitable amylases are commercially available for example under the names Maxamyl®, Termamyl®, Duramyl® and Purafect® OxAm. The cellulase which can be used may be an enzyme obtainable from bacteria or fungi which preferably has a pH optimum in the weakly acidic to weakly alkaline range from 6 to 9.5. Such cellulases are known for example from German Offenlegungsschriften DE 31 17 250, DE 32 07 825, DE 32 07 847, DE 33 22 950 or European patent applications EP 265 832, EP 269 977, EP 270 974, EP 273 125 and also EP 339 550 and the international patent applications WO 95/02675 and WO 97/14804 and are commercially available under the names Celluzyme® and Carezyme® and Ecostone®.

The customary enzyme stabilizers which may be present, particularly in novel liquid products include aminoalcohols, for example mono-, di-, triethanolamine and -propanolamine and mixtures thereof, low molecular weight carboxylic acids as are known for example, from European patent applications EP 376 705 and EP 378 261, boric acid or alkali metal borates, boric acid-carboxylic acid combinations, as known, for example, from European patent application EP 451 921, boric esters, as known, for example, from international patent application WO 93/11215 or European patent application EP 511 456, boronic acid derivatives, as known, for example, from European patent application EP 583 536, calcium salts, for example the Ca-formic acid combination known from European patent EP 28 865, magnesium salts, as known, for example, from European patent application EP 378 262, and/or sulfur-containing reducing agents, as known, for example, from European patent applications EP 080 748 or EP 080 223.

Suitable foam inhibitors include long-chain soaps, in particular behenic soap, fatty acid amides, paraffins, waxes, microcrystalline waxes, organopolysiloxanes and mixtures thereof, which may also comprise microfine, optionally silanized or otherwise hydrophobicized silica. For use in particulate products, such foam inhibitors are preferably bonded to granular, water-soluble carrier substances, as described, for example, in German Offenlegungsschrift DE-A-34 36 194, European patent applications EP 262 588, EP 301 414, EP 309 931 or European patent EP 150 386.

A novel product which comprises a polymer used according to the invention may also comprise antiredeposition agents. Antiredeposition agents have the task of keeping the dirt detached from the fiber suspended in the liquor and thus preventing graying of the fibers. For this purpose, water-soluble colloids of a mostly organic nature are suitable, for example the water-soluble salts of polymeric carboxylic acids, glue, gelatin, salts of ether carboxylic acids or ether sulfonic acids of starch or of cellulose or salts of acidic sulfuric acid esters of cellulose or of starch. Water-soluble polyamides containing acidic groups are also suitable for this purpose. Soluble starch preparations and starch products other than those given above can be used, for example a partially hydrolyzed starch. Sodium carboxymethylcellulose, methylcellulose, methylhydroxyethylcellulose and mixtures thereof are preferably used.

Another embodiment of a novel product which comprises a soil release polymer to be used according to the invention comprises bleaches based on peroxygen, in particular in amounts in the range from 5% by weight to 70% by weight, and optionally bleach activators, in particular in amounts in the range from 2% by weight to 10% by weight. Suitable bleaches are the percompounds normally used in detergents, such as hydrogen peroxide, perborate, which may be in the form of tetra- or monohydrate, percarbonate, perpyrophosphate and persilicate, which are normally in the form of alkali metal salts, in particular as sodium salts. Such bleaches are present in detergents which comprise a polymer used according to the invention, preferably in amounts up to 25% by weight, in particular up to 15% by weight and particularly preferably from 5% by weight to 15% by weight, in each case based on the total product, with percarbonate being used in particular. The component of the bleach activators which may be present includes the customarily used N— or O-acyl compounds, for example polyacylated alkylenediamines, in particular tetraacetylethylenediamine, acylated glycolurils, in particular tetraacetylglycoluril, N-acylated hydantoins, hydrazides, triazoles, urazoles, diketopiperazines, sulfuryl amides and cyanurates, and carboxylic anhydrides, in particular phthalic anhydride, carboxylic acid esters, in particular sodium isononanoylphenolsulfonate, and acylated sugar derivatives, in particular pentaacetylglucose. In order to avoid interaction with the percompounds during storage, the bleach activators may be coated with coating substances in a known manner or be granulated, the use of carboxymethylcellulose to produce granulated tetraacetylethylenediamine having mean particle sizes of from 0.01 mm to 0.8 mm, as can be produced, for example, by the process described in European patent EP 37 026, and/or granulated 1,5-diacetyl-2,4-dioxohexahydro-1,3,5-triazine, as can be prepared according to the process described in German patent DD 255 884 being particularly preferred. In detergents, such bleach activators are preferably present in amounts up to 8% by weight in particular from 2% by weight to 6% by weight, in each case based on the total product.

In a preferred embodiment, a composition in which the soil release polymer to be used according to the invention is incorporated is particulate and comprises from 20% by weight to 55% by weight of inorganic builders, up to 10% by weight and especially from 2% by weight to 8% by weight of water-soluble organic builders, from 10% by weight to 25% by weight of synthetic anionic surfactant, from 1% by weight to 5% by weight of nonionic surfactant, up to 25% by weight and especially from 5% by weight to 20% by weight of bleach, especially alkali metal percarbonate, up to 15% by weight, especially from 1% by weight to 10% by weight of bleach activator and up to 25% by weight and especially from 0.1% by weight to 25% by weight of inorganic salts, especially alkali metal carbonate and/or bicarbonate.

EXAMPLES

Example 1

Preparation of Polyurethanes 492.4 g or 1208.5 g of polyethylene glycol 600 (degree of polymerization about 13) were introduced as an initial charge and dewatered at 80° C. and 1 mbar for about 2 h. 187.7 g and 375.4 g respectively of 4,4'-diphenylmethane diisocyanate were then added in portions of 40 to 50 g at 80° C. under nitrogen over about 90 min. This was followed by stirring under nitrogen at 80° C. until the isocyanate was all used up (about 2 h). This gave the prepolymers P1 (average molecular weight about 6600) and P2 (average molecular weight about 2700) respectively.

465 g of P1 were dewatered with 468 g of polyethylene glycol 6000 (degree of polymerization about 137) and 23 g of 12-hydroxyoctadecan-1-ol at 100° C. and 2 mbar for about 2 h with stirring and subsequently reacted with 44 g of tetramethylxylylene diisocyanate at 150 to 160° C. to a constant melt viscosity to form the polymer SRP1 (OH:NCO ratio 1.21).

575 g of P2 were dewatered with 318 g of polyethylene glycol 6000 (degree of polymerization about 137) and 30 g of 12-hydroxyoctadecan-1-ol at 100° C. and 2 mbar for about 2 h with stirring and subsequently reacted with 77 g of tetramethylxylylene diisocyanate at 150 to 160° C. to a constant melt viscosity to form the polymer SRP2 (OH:NCO ratio 1.14).

267 g of P2 were dewatered with 118 g of polyethylene glycol 6000 (degree of polymerization about 137), 14 g of 12-hydroxyoctadecan-1-ol and 23 g of dimethylolpropionic acid at 90° C. and 1 mbar for about 1 h with stirring and subsequently reacted with 78 g of tetramethylxylylene diisocyanate at 140 to 150° C. to a constant melt viscosity to form the polymer SRP3 (OH:NCO ratio 1.06).

Example 2

A laundry detergent composition (V1) comprising

| | |
|---|---|
| ABS | 12 parts by weight |
| FAS | 5 parts by weight |
| C12/14 7 EO | 3 parts by weight |
| TAED | 7 parts by weight |
| percarbonate | 17 parts by weight |
| sodium carbonate | 13 parts by weight |
| Zeolite | 28 parts by weight |
| Sokalan CP 5 | 5 parts by weight |
| Tinopal DMS-X | 0.2 part by weight | was admixed with 2 parts by weight of SRP1 (W1) or with 2 parts by weight of SRP2 (W2). Fabrics composed of pure cotton, resin-finished cotton and 50/50 polyester/cotton were treated as follows:

| | |
|---|---|
| Washing machine: | Miele W 918 Novotronic |
| Primary wash: | standard program single-liquor process |
| Wash temperature: | 40° C. |
| Determination: | 3 fold |
| Liquor volume: | 18 l |
| Water hardness: | 16° of German hardness |
| Ballast: | 3.5 kg of clean laundry |

The unstained fabrics were washed three times under the above-indicated conditions with the laundry detergent composition to be tested and dried after each wash. After the threefold prewashing, the fabrics were stained by hand with the following standardized soils:

0.15 g of creme rouge 0.10 g of lipstick 0.10 g of black shoe polish 0.10 g of dust/sebum The stained fabrics were measured with a Minolta CR 200 and subsequently aged at RT for 7 days. Thereafter the stained fabrics were tacked onto towels and washed under the above-indicated conditions.

The fabrics were dried and remeasured with a Minolta CR 200. The following wash results were obtained (dde values):

TABLE 2

Pure cotton

|  | Lipstick | Black shoe polish | Creme rouge | Dust/ sebum |
| --- | --- | --- | --- | --- |
| V1 | 68.2 | 41.8 | 42.1 | 54.4 |
| W1 | 72.5 | 40.1 | 45.1 | 58.1 |
| W2 | 76.9 | 47.7 | 44.8 | 59.6 |

TABLE 3

Resin-finished cotton

|  | Lipstick | Black shoe polish | Creme rouge | Dust/ sebum |
| --- | --- | --- | --- | --- |
| V1 | 67.5 | 41.3 | 26.4 | 43.3 |
| W1 | 74.6 | 42.9 | 29.7 | 46.5 |
| W2 | 75.1 | 42.9 | 31.0 | 46.7 |

TABLE 4

Cotton-polyester

|  | Lipstick | Creme rouge | Dust/ sebum |
| --- | --- | --- | --- |
| V1 | 65.8 | 41.4 | 47.1 |
| W1 | 73.9 | 41.6 | 55.9 |
| W2 | 77.7 | 43.0 | 60.9 |

The results show that the laundry detergent compositions comprising the polymers to be used according to the invention (W1 and W2) provide a distinctly better washing performance than the composition lacking the polymer.

What is claimed is:

1. A method of washing a soiled textile comprising cotton, the method comprising contacting the textile with a wash liquor, the wash liquor is comprised of a soil-release effective amount of a soil release polymer which is an ecologically and toxicologically safe polyurethane which is the product of the process comprising the steps of polymerizing one or more polyisocyanates with (a) an excess of one or more polymeric polyols of the formula I $$W[O-(CH_2-)_a)_b-OH]_c \quad (I)$$

to form an OH-terminated prepolymer wherein one or more polymeric polyols have an average molar mass of above 1000 D and a 20° C. water solubility of above 300 g of polymer per liter; wherein a is a number from 1 to 3; b is a number from 17 to 800 and c is a number from 1 to 6; wherein b can vary within any one molecule; W is H— when c=1, —(CH2)$_d$— when c=2, wherein d is a number from 2 to 12; —CH$_2$(CH)$_e$CH$_2$— when c=e+2, wherein e is a number from 1 to 4; —(CH$_2$)$_e$CH(CH$_2$)—(CH$_2$)$_e$— when c=3; or any aliphatic, alicyclic or aromatic radical or a radical which comprises both aliphatic and aromatic groups and (b) reacting the prepolymer with one or more polyols of the formula II, III, IV, or V $$HO-X-CHY-OH \quad (II)$$

where X is a linear or branched alkylene group having 1 to 48 carbon atoms and Y is hydrogen or an alkyl group having 1 to 24 carbon atoms;

$$V[(O-((CH_2-)_fCHR^1-)_g)_h-OH]_i \quad (III)$$

wherein $R^1$ represents hydrogen or an alkyl group having 1 to 6 carbon atoms, f is a number from 0 to 3, g is a number from 1 to 4 and h is a number from 5 to 300, wherein $R^1$, f and h can each vary within any one molecule; V is H when I=1; —(CH2)$_k$— when i=2, wherein k is a number from 2 to 12; —CH$_2$—(CH—)$_l$—CH$_2$— where i=l+2, wherein l represents a number from 1 to 4, —(CH$_2$)$_l$—CH(CH$_2$—)—(CH$_2$)$_l$— when c=3, l is a number from 1 to 4, or any aliphatic, alicyclic or aromatic radical or a radical which comprises both aliphatic and aromatic groups;

$$HO((-CHR^2(-CH_2)_m-)_n-O)_o-Cy-C(R^3)(R^4)-Cy-(O-((CH_2-)_pCHR^2-)_q)_r-OH \quad (IV)$$

where Cy is phenylene or cyclohexylidene; $R^2$ is hydrogen or an alkyl group having 1 to 6 carbon atoms, each of $R^3$ and $R^4$ is independently hydrogen or an alkyl group having 1 to 6 carbon atoms or together form an aliphatic bridge $(CR^5R^6)_s$, wherein s is a number from 4 to 6 and each of $R^5$ and $R^6$ is independently H or an alkyl group having 1 to 6 carbon atoms or a double bond, wherein each of $R^5$ and $R^6$ can vary within any one bridge; each of m and p independently is a number from 0 to 3; each of n and q is independently a number from 1 to 4; each of o and r is independently a number from 0 to 20, wherein $R^2$, m and p can vary within any one molecule;

$$V[-O-C(O)-(C(R^7)(R^8))_t-(CHOH)_u-(CH_2)_w-H]_i \quad (V)$$

wherein each of $R^7$ and $R^8$ independently H or an alkyl group having 1 to 6 carbon atoms or a multiple bond to the adjacent carbon atom wherein $R^7$ and $R^8$ can vary within any one molecule; each of t and w independently a number from 0 to 20 and u is 1, wherein t, u and w can vary within any one molecule, V is H— or CH$_3$— when i=1, —(CH$_2$)$_k$— when i=2, wherein k is a number from 2 to 12; —CH$_2$—(CH—)$_l$—CH$_2$— where i=l+2, wherein l is a number from 1 to 4, HO—CH$_2$—(CH—)$_l$—CH$_2$— when i=l+1, wherein l is a number from 1 to 4, —(CH$_2$)$_l$—CH(CH$_2$—)—(CH$_2$)$_l$— when c=3, wherein l is a number from 1 to 4, or represents any aliphatic, alicyclic or aromatic radical or a radical which comprises both aliphatic and aromatic groups; wherein each of the compounds of formula II, III, IV and V has an average molar mass of below 12,000 D and a 20° C. water solubility of below 100 g per liter and wherein the ratio of the total number of moles of polyol to the total number of moles of polyisocyanate is from 1:1 to 1.5:1.

2. The method of claim 1 wherein the textile has already been washed in the presence of the one or more soil release polymers before becoming soiled.

3. The method of claim 1 wherein the wash liquor further comprises one or more polyester-active dicarboxylic acid soil release polymers and optionally one or more polymeric diols.

4. The method of claim 1 wherein the compound of formula I is a polyethylene glycol.

5. The method of claim 1 wherein the polyethylene glycol has an average molar mass between 3000 and 12,000 D.

6. The method of claim 1 wherein the one or more polyisocyanates comprise a molecule of the general structure (O═C═N—)$_t$Z wherein t is 2 or 3, Z is an aliphatic or aromatic radical or a radical which comprises both aliphatic and aromatic groups.

7. The method of claim 6 wherein the one or more polyisocyanates comprise a diisocyanate.

8. The method of claim 7 wherein the diisocyanate is diphenylmethane diisocyanate and/or tetramethylxylol diisocyanate.

9. The method of claim 1 wherein the molar ratio of polyol to polyisocyanate is from 1.05:1 to 1.3:1.

10. The method of claim 1 wherein the polymerization of the polyisocyanates and the polyols is comprised of a first stage of forming a prepolymer by reacting a diisocyanate and a polymeric dial of formula (I) using excess diol and extending the prepolymer in a second stage by reaction with further diisocyanate and a diol of formulae (II), (III), (IV) or (V).

11. The method of claim 10 wherein a different diisocyanate is used in the second stage than in the first stage.

12. The method of claim 10 wherein a plurality of polymeric diols of formula (I) having different degrees of polymerization is used, the polymeric diol of formula (I) having the lowest degree of polymerization being used in the first stage, and that or those polymeric diols of formula (I) having having higher degrees of polymerization being used in the second stage together with the one or more diols of formulae (II), (III), (IV) or (V).

13. The method of claim 12 wherein the one or more polymeric diols of formula (I) where b represents a number from 3 to 16 and the second stage uses one or more polymeric diols of formula (I) where b represents a number from 17 to 800 are used in the first stage.

14. A laundry detergent composition comprising the soil release polymer of claim 1.

15. The composition of claim 14 comprising the soil release polymer in amounts from 0.1% to 5% by weight.

16. The composition of claim 15 comprising the soil release polymer in amounts from 0.5% to 2.5% by weight.

* * * * *